Patented May 25, 1937

2,081,355

UNITED STATES PATENT OFFICE 2,081,355

PROCESS OF PREPARING GLYOXYLIC ACID

Paul Heisel, Gersthofen, near Augsburg, Germany, assignor to I. G. Farbenindustrie Aktiengesellschaft, Frankfort-on-the-Main, Germany No Drawing. Application April 27, 1934, Serial No. 722,818. In Germany May 4, 1933

6 Claims. (Cl. 260—112)

The present invention relates to a process of preparing glyoxylic acid.

It is known that glyoxylic acid may be obtained by causing anhydrous potassium acetate to react with a concentrated aqueous solution of potassium dichloro-acetate, while boiling. During this reaction there is first formed the di-acetoxy-acetic acid or the potassium salt thereof. For the preparation of potassium glyoxylate this diacetyl compound has to be subjected to a hydrolysis by boiling it with a large quantity of water.

I have now found that the glyoxylic acid or the salts thereof are obtainable in one reaction by causing a metal salt of dichloro-acetic acid in a dilute, instead of a concentrated, aqueous solution to react with a metal salt of another organic acid. For obtaining good yields the metal salt of the other organic acid is used in a quantity of about 2 mols per 1 mol. of dichloro-acetic acid.

By reducing that quantity of 2 mols of the other acid the yields of glyoxylic acid get generally more and more inferior proportionately to reducing the acid. If the proportion of the other acid is increased beyond 2 mols, an increase of the yield may in some cases be obtained.

The other acid to be used may be: acetic acid, para-chloro-benzoic acid, phthalic acid, terephthalic acid, meta-benzene-disulfonic acid, butyric acid, benzoic acid and others.

By operating according to the present invention there is obtained, not at first the salt of diacetyl-glyoxylic acid but directly the salt of glyoxylic acid. The reaction of the dichloro-acetate to obtain di-acetoxy-acetate and the saponification thereof to obtain glyoxylate occur in the present process in one operation. Besides this considerable simplification of the manufacture, the method of preparing glyoxylic acid I have found involves the advantage that the reaction occurs under mild conditions, a fact which, owing to the sensitiveness of the glyoxylic acid and the compounds thereof, becomes evident particularly in an increase of the yield.

The process may with advantage be carried out as follows: For instance sodium dichloroacetate is dissolved in 10 to 15 times its weight of water and the solution is boiled in a reflux apparatus, for instance, for 36 to 60 hours together with 2 mols of sodium acetate. The course of the reaction may be observed by titration of the chlorine ion which is formed in the solution. As soon as the process is complete, the glyoxylic acid is isolated according to known methods from the solution of its salt.

The following examples serve to illustrate the invention, but they are not intended to limit it thereto:

(1) 500 grams of dichloro-acetic acid are dissolved in 6 liters of water and the solution is neutralized with caustic soda solution. After the addition of 1100 grams of crystallized sodium acetate the liquid is kept gently boiling for 48 hours. After the water has been evaporated, there remains a mixture of sodium glyoxylate, sodium chloride and small quantities of non-converted sodium dichloro-acetate. The latter is extracted with alcohol. After the acidification with hydrochloric acid, there is obtained from the salt mixture remaining after the extraction an aqueous glyoxylic acid solution from which, according to the degree of evaporation, a glyoxylic acid of any desired concentration may be obtained. The yield amounts to 90 per cent.

(2) 400 grams of dichloro-acetic acid and 1140 grams of benzoic acid are neutralized with 492 grams of NaOH while adding 3 liters of water. The reaction mixture is kept for 20 hours under a pressure of carbon dioxide of 2.5 atmospheres at a temperature of about 110° C., while thoroughly stirring. After the reaction is complete, the mixture is acidified with 418 grams of hydrochloric acid of 38 per cent. strength and is centrifuged in order to remove the benzoic acid. The centrifuged liquid is evaporated until the glyoxylic acid contained therein has the desired concentration. The sodium chloride which separated during this operation is eliminated by filtration or centrifuging. The yield amounts to about 80 to 85 per cent. calculated upon the dichloro-acetic acid used.

I claim:

1. The process which comprises reacting upon a metal salt of dichloro-acetic acid in dilute aqueous solution with a metal salt of another organic acid while heating to boiling.

2. The process which comprises reacting upon a metal salt of dichloro-acetic acid in dilute aqueous solution with about 2 mols of a metal salt of another organic acid while heating to boiling.

3. The process which comprises reacting upon an alkali metal salt of dichloro-acetic acid in dilute aqueous solution with an alkali metal salt of another organic acid while heating to boiling.

4. The process which comprises reacting upon an alkali metal salt of dichloro-acetic acid in dilute aqueous solution with about 2 mols of an alkali metal salt of another organic acid while heating to boiling.

5. The process which comprises reacting upon an alkali metal salt of dichloro-acetic acid in dilute aqueous solution with about 2 mols of sodium acetate while heating to boiling.

6. The process which comprises reacting upon an alkali metal salt of dichloro-acetic acid in dilute aqueous solution with about 2 mols of sodium benzoate while heating to boiling.

PAUL HEISEL.